US008768491B2

(12) United States Patent
Schultze et al.

(10) Patent No.: US 8,768,491 B2
(45) Date of Patent: Jul. 1, 2014

(54) METHOD FOR AXIS CORRECTION IN A PROCESSING MACHINE AND PROCESSING MACHINE

(75) Inventors: Stephan Schultze, Lohr-Wombach (DE); Holger Schnabel, Veitshoechheim (DE); Joachim Thurner, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 511 days.

(21) Appl. No.: 13/130,504

(22) PCT Filed: Nov. 19, 2009

(86) PCT No.: PCT/EP2009/008240
§ 371 (c)(1),
(2), (4) Date: Aug. 8, 2011

(87) PCT Pub. No.: WO2010/057636
PCT Pub. Date: May 27, 2010

(65) Prior Publication Data

US 2011/0307082 A1 Dec. 15, 2011

(30) Foreign Application Priority Data

Nov. 21, 2008 (DE) ........................ 10 2008 058 458

(51) Int. Cl.

| | |
|---|---|
| ***G05B 19/18*** | (2006.01) |
| ***G05B 13/02*** | (2006.01) |
| ***G05B 11/32*** | (2006.01) |
| ***G05B 11/01*** | (2006.01) |
| ***B29B 9/00*** | (2006.01) |
| ***B29D 29/00*** | (2006.01) |
| ***A23G 1/22*** | (2006.01) |
| ***G03G 15/00*** | (2006.01) |
| ***B41D 7/00*** | (2006.01) |
| ***B41L 19/00*** | (2006.01) |

(52) U.S. Cl.
USPC .................. 700/61; 700/41; 700/69; 700/71; 425/11; 425/28.1; 425/110; 101/2; 101/33; 101/45

(58) Field of Classification Search
USPC ......... 425/11, 28.1, 110, 135; 700/61, 69, 71, 700/41–46; 101/2, 33, 35, 45
See application file for complete search history.

(56) References Cited

U.S. PATENT DOCUMENTS

2005/0043834 A1 2/2005 Rotariu et al.
2005/0051931 A1 3/2005 Humlicek et al.

(Continued)

FOREIGN PATENT DOCUMENTS

DE 4322744 1/1995
DE 10135773 2/2003

(Continued)

OTHER PUBLICATIONS

PCT Search Report corresponding to to PCT Application No. PCT/EP2009/008240, mailed Mar. 31, 2010 (German and English language document) (16 pages).

(Continued)

*Primary Examiner* — Darrin Dunn
(74) *Attorney, Agent, or Firm* — Maginot, Moore & Beck

(57) ABSTRACT

A method for axis correction in a processing machine, in particular a shaftless printing machine, has at least one axis for processing and/or transporting a material, at least one detection device for detecting a processing parameter and at least one controller device for calculating a controller output variable for axis correction of the at least one axis using the detected processing parameter. The method is implemented iteratively, with the result that feedforward control output values for the feedforward control of the axis correction are determined during an (n+1)-th change in rotation speed of the at least one axis using observation of the controller output variable and/or the processing parameter during an n-th change in rotation speed of the at least one axis.

8 Claims, 2 Drawing Sheets

(56) References Cited

U.S. PATENT DOCUMENTS

| | | | | |
|---|---|---|---|---|
| 2006/0005722 | A1* | 1/2006 | Nobukawa et al. | 101/181 |
| 2006/0185551 | A1* | 8/2006 | Mehlis et al. | 101/484 |
| 2007/0068210 | A1* | 3/2007 | Pittner et al. | 72/10.1 |
| 2008/0148981 | A1* | 6/2008 | Brandenburg et al. | 101/485 |
| 2009/0278303 | A1* | 11/2009 | Fuwa | 271/225 |
| 2011/0203472 | A1* | 8/2011 | Shin et al. | 101/486 |

FOREIGN PATENT DOCUMENTS

| | | |
|---|---|---|
| DE | 102005054975 | 5/2007 |
| DE | 102005057975 | 6/2007 |
| DE | 102007037564 | 2/2009 |
| DE | 102007062454 | 7/2009 |
| EP | 0709184 | 5/1996 |

OTHER PUBLICATIONS

Search Report of the German Patent and Trademark Office corresponding to German Patent Application No. DE 10 2008 058 458.4 dated Jul. 20, 2009 (German language document)(4 pages).

Unbehauen, Rolf: Systemtheorie. Grundlagen fur Ingenieure, 5.Aufl., Oldenburg Verlag, 1990, S.527-535 (German Language document) (6 pages).

* cited by examiner

METHOD FOR AXIS CORRECTION IN A PROCESSING MACHINE AND PROCESSING MACHINE

This application is a 35 U.S.C. §371 National Stage Application of PCT/EP2009/008240, filed Nov. 19, 2009, which claims the benefit of priority to Serial No. 10 2008 058 458.4, filed Nov. 21, 2008 in Germany, the disclosures of which are incorporated herein by reference in their entirety.

BACKGROUND

The disclosure relates to a method for axis correction in a processing machine and to a corresponding processing machine, a corresponding computer program and a corresponding computer program product.

Although reference is primarily made below to printing machines, the disclosure is not restricted to this, but is directed to all types of processing machines with driven and non-driven axes or rollers. The disclosure can be used in particular in printing machines such as newspaper printing machines, job printing machines, intaglio printing machines, packaging printing machines or security printing machines as well as in processing machines such as bagging machines, envelope machines or packaging machines, for example. The continuous web may be formed from paper, cloth, cardboard, plastic, metal, rubber, in film form etc.

In processing machines, in particular printing machines, material in sheet form or in the form of a continuous web is moved along driven axes (transport axes), such as drawing rollers or feed rollers, for example, and non-driven axes, such as deflecting rollers, guide rollers or cooling rollers, for example. The material is processed simultaneously by means of usually likewise driven processing axes, for example is printed, stamped, cut, folded etc.

The processing and transport of the material influence both a web tension and a processing register, for example a color or longitudinal register. In conventional processing machines, it is therefore usual to control the processing register and/or the web tension. In printing machines, longitudinal and/or lateral registers are controlled in order to achieve an optimum print result.

In the prior art, acceleration and braking operations are included in the web tension control and the register control only to a small degree, for example by means of taking into consideration a permanently stored ramp-up curve of the processing axes or by means of taking into consideration permanently stored constant web tension setpoint value changes.

One disadvantage of these measures is the fact that, in the event of acceleration operations, errors in the register and in the web tension are not taken into consideration on the basis of the present acceleration value, but merely on the basis of a permanently stored acceleration value, for which reason all errors occurring need to be compensated for as control difference of a web tension or register controller.

DE 101 35 773 A1 describes feedforward control for the time of a change in role, wherein parameters of the new role such as, for example, moisture, thickness, stress-strain characteristic and absorption capacity for moisture are taken into consideration.

DE 10 2007 037 564 describes the determination of feedforward control values for the register control during a change in speed taking into consideration the moment of inertia of non-driven rollers.

In EP 0 709 184 A1, feedforward control values for different printing speeds are determined by measurement runs. These are relatively time-consuming and furthermore result in printer's waste.

One disadvantage of the known solutions is the fact that the basic model used as the basis for the calculation of feedforward control values from the parameters respectively to be taken into consideration only incompletely simulate reality and also change the actual machine and material data on the basis of physical influences such as temperature in the dryer, ambient temperature, for example, during the processing, which results in further deviations. No damping-dependent proportion of the material web which has a strong influence on the web tension and the register during acceleration phase, particularly in the case of film-like printed materials, is taken into consideration either, for example.

There is therefore the problem of specifying an improved method for axis correction during a change in speed.

This problem is solved by a method for axis correction, a processing machine, a computer program and a computer program product having the features of the independent patent claims. Advantageous developments are the subject matter of the dependent claims and the following description.

A processing machine according to the disclosure, in particular a shaftless printing machine, has at least one axis for processing and/or transporting a material, at least one detection device for detecting a processing parameter and at least one controller device for calculating a controller output variable or manipulated variable for axis correction of the at least one axis using the detected processing parameter. The detected processing parameter may be in particular a register position or a web tension or the corresponding deviations or errors, wherein in the event of a register and/or web tension error being detected, a register and/or web tension correction is then implemented as axis correction. The controller device is designed to implement a method according to the disclosure, namely to determine feedforward control output values for the feedforward control of the axis correction during a second change in rotation speed of the at least one axis using observation of the controller output variable during a first change in rotation speed. The method is implemented iteratively. Since with the first run of the method there are not yet any adapted feedforward control values available, the associated feedforward control values (or the compensation values to be explained further below) can be determined on the basis of a model, for example, or can be taken from a stored formula, as will be described further below. A suitable model is, for example, one of those described above in the description of the prior art.

In addition, it is possible to determine second feedforward control output values on the basis of a model using known machine or material parameters which, in addition to the feedforward control output values, are used for the feedforward control of the axis correction and, when totaled, for example, form total feedforward control output values.

Although the disclosure will be described below essentially with reference to the observation of the controller output variable, the observation of the processing parameter is also always intended thereby. For example, in the case of purely a P register controller, the controller output variable would be proportional to the register error, for which reason in this case the observation of the register error is equivalent to the observation of the controller output variable. Expediently, the register error determined respectively at the axis is observed as register error. Generally, feedforward control output values for the feedforward control of the axis correction can be determined during a subsequent change in rotation speed of the at least one axis also using an observation of the controlled variable (feedback variable) or the control deviation during a proceeding change in rotation speed.

Advantageously, the feedforward control of all relevant axes of the processing machine is performed. In particular, in order to control or to adjust the web tension in a web tension section, feedforward control of the clamping points delimiting the web tension section is performed and, in order to control or adjust the register of a processing axis within a web tension section, feedforward control of the processing axis and/or the clamping points which delimit the web tension section is performed. If the processing axes at the same time ensure the transport of the material and are therefore in the form of clamping points, in order to regulate or adjust the register, feedforward control of this processing axis itself is performed.

Typically, additive angle offsets, additive speeds and/or multiplicative speed factors (so-called fine tuning, gear ratios) are subjected to feedforward control as feedforward control output values.

SUMMARY

The adaptive feedforward control according to the disclosure represents a marked improvement over the prior art since it is now possible for predictive feedforward control of the errors to be expected to be provided instead of needing to respond to an error which has already occurred. The adaptive method implements iterative observation of the controller output variable and/or the processing parameter during an acceleration process in order to use this output variable or the processing parameter in the subsequent, identical acceleration process as feedforward control output variable or in order to allow said variable or parameter to be included in said feedforward control output variable and therefore to reduce the occurrence of axis deviations. The controller therefore now only needs to correct relatively small residual deviations in the second run, wherein the controller output variables required for this purpose or the processing parameters then determined are in turn used for improving the feedforward control. It is very advantageous that no machine or material parameters need to be used for this method. The disclosure is therefore universally applicable. It is not necessary to determine machine and material data in a manner which sometimes involves a very high level of complexity which are nevertheless subject to errors or change again during operation. By virtue of the axis correction, register and/or web tension changes during an acceleration or braking phase are reduced, which is reflected directly in a reduction in waste material, so-called printer's waste. Owing to the additional feedforward control, more effective control strategies can be created since it is possible to exert a greater influence on the continuous web. Iterative feedforward control taking into consideration the controller output variable or a processing parameter is not used in the known prior art. Therefore, only slowly running acceleration and braking operations can be implemented. Furthermore, waste material produced during these phases needs to be accepted. The disclosure overcomes these disadvantages.

Owing to the measure according to the disclosure, there is greater decoupling of the continuous web in register and/or web tension control processes. The static and dynamic error between the individual processing and printing mechanisms decreases. Furthermore, it is possible for register errors to be compensated for more quickly. The reaction of an acceleration or braking phase on the processing parameter (web tension or register) is reduced, which makes in particular quicker or more dynamic acceleration or braking operations possible. Overall, waste material or printer's waste is markedly reduced, which results in a reduction in production costs, inter alia.

Advantageously, the feedforward control output values are determined depending on a speed, for example an axis speed (rotation), a machine speed (guide axis) and/or on an acceleration (for example of the at least one axis and/or the machine). There is the option of determining the feedforward control output values in production-dependent fashion, i.e. all of the machine and material data remain substantially constant or fluctuate only within a certain range. In this case, substantially only the present speed and/or the present acceleration have an influence on the processing parameter during a rotation speed change phase. The method can therefore be implemented in a very simple manner. The unavoidable changes in the machine and material data are largely compensated for by the iterative procedure.

The feedforward control is therefore advantageously performed taking into consideration the instantaneous speed and/or the instantaneous acceleration. Since the error to be expected is proportional to the change in speed occurring, i.e. positive or negative acceleration, this acceleration is advantageously likewise taken into consideration in the feedforward control. If the feedforward control is performed taking into consideration a guide axis speed, the acceleration can be determined from this guide axis, for example by means of time derivation. If the feedforward control is performed taking into consideration a real speed of a processing device, for example a rotation speed, the acceleration can be determined, for example, by derivation of specific sensor values, for example two-fold derivation of the position sensor values or single-fold derivation of the speed sensor values. For the position or speed measurement, it is also possible, for example, for information printed on the continuous web, such as marks, punched holes, etc. to be sensed. Likewise, the determination by means of an acceleration sensor is possible. Also possible is the transmission of the values from the machine controller to the arithmetic logic unit for the web tension control or register control by means of fieldbus communication, for example, wherein a setpoint position, setpoint speed, setpoint acceleration, setpoint jolt, actual position, actual speed, actual acceleration or actual jolt of the machine guide position, for example, can be transmitted. Particularly advantageous is a fieldbus communication which is in the form of real time communication and synchronously exchanges data between the machine controller and the web tension or register control. Such fieldbus systems are known, for example, under the name SERCOS III, PROFINET or Ethernet Powerlink. Also possible is the transmission of binary signals which indicate a change in speed from the machine controller to the arithmetic logic unit for the web tension or register control and the knowledge of fixedly predetermined jolts or acceleration values in the arithmetic logic unit for the web tension or register control. Finally, an estimation of the acceleration can be performed using further process variables, such as the drive torques, for example.

As a result, it is advantageously possible for a first functional relationship between the feedforward control output value and the speed and a second functional relationship between the feedforward control output value and the acceleration to be determined and specified, with in each case one compensation value entering said relationships, it being possible for said compensation value to be determined easily using the observation of the controller output variable or the processing parameter.

The first compensation value, which is dependent on the speed, for the feedforward control of the axis correction during the (n+1)-th run is preferably determined iteratively from a first correction value and the first compensation value of the n-th run, preferably summated.

The second compensation value, which is dependent on the acceleration, for the feedforward control of the axis correction during the (n+1)-th run is likewise advantageously determined iteratively from a second correction value and the second compensation value of the n-th run, preferably summated.

The respective correction values are in turn expediently determined using the controller output variables or processing parameters at certain, selected speeds during the n-th change in rotation speed. The interval and number of speed values used is in principle freely selectable. However, it has proven to be expedient to determine the first correction value as the difference in the controller output variables or processing parameters at a first and a second speed during the n-th change in rotation speed. Therefore, the first correction value can be calculated particularly easily in accordance with this configuration. It is advantageous if the first speed is the speed at the beginning of the n-th change in rotation speed and the second speed is the speed at the end of the n-th change in rotation speed.

It has likewise proven to be expedient that, advantageously, the controller output variable or the processing parameter at a third speed, which can correspond in particular to the first speed, i.e. in particular the speed at the beginning of the n-th change in rotation speed, an acceleration value during the n-th change in rotation speed, for which the maximum value of the acceleration is preferably used, and a differentiated controller output variable, i.e. in particular a maximum value of the derivative, during the n-th change in rotation speed enter into the second correction value.

It is advantageous if a weighting factor of between 0 and 1 enters into the first and/or second correction value as well in order to adjust the degree of iterative matching of the correction between the individual changes in rotation speed. This weighting factor can also be changed during the operation between the changes in rotation speed in order to accelerate a transient response which occurs in the iterative matching process by relatively large weighting factors of >0.5, for example, at relatively large controller output variables (above a threshold value), for example, and to now only permit relatively small changes in the iteration operation as a result of relatively small weighting factors of <0.5, for example, at relatively small controller output variables (beneath a threshold value).

It is possible in this way to determine feedforward control output variables in a particularly simple manner depending on a speed and/or an acceleration, said feedforward control output values ultimately being characterized by in each case one compensation value. Expediently, the first or the second functional relationship is divided into at least two dependency ranges. In this case, the first functional relationship is divided into at least two speed ranges and the second functional relationship into at least two acceleration ranges. The ranges can be used in a simple manner for defining different dependencies sectionally. For example, the feedforward control output variable can be constant in one range, be proportional to the instantaneous speed or to the instantaneous acceleration in another range and have a different dependency, for example a polynomial dependency, in yet another range. The compensation values in these cases describe the constants, the proportionality factor, a polynomial factor etc., for example.

One option is to store the once determined compensation values in a production-dependent manner in the sense of a formula in order to be able to reuse said compensation values even after production changes at a later point in time. Each formula is characterized by certain, production-specific parameters such as the machine used, the material used, the colors used etc.

The disclosure also relates to a computer program with program code means for implementing all of the steps of a method according to the disclosure when the computer program is run on a computer or a corresponding arithmetic logic unit, in particular in a processing machine according to the disclosure.

The computer program product provided according to the disclosure with program code means which are stored on a computer-readable data carrier is designed for implementing all of the steps of a method when the computer program is run on a computer or a corresponding arithmetic logic unit, in particular in a processing machine. Suitable data carriers are in particular disks, hard disk drives, flash memories, EEPROMs, CD-ROMs, DVDs and much more. A download of a program via computer networks (Internet, intranet etc.) is also possible.

Further advantages and configurations of the disclosure are given in the description and the attached drawing.

It goes without saying that the features mentioned above and those yet to be mentioned below can be used not only in the respectively cited combination, but also in other combinations or on their own without departing from the scope of the present disclosure.

The disclosure is illustrated schematically using an exemplary embodiment in the drawing and will be described in detail below with reference to the drawing.

DETAILED DESCRIPTION

Figure 1:
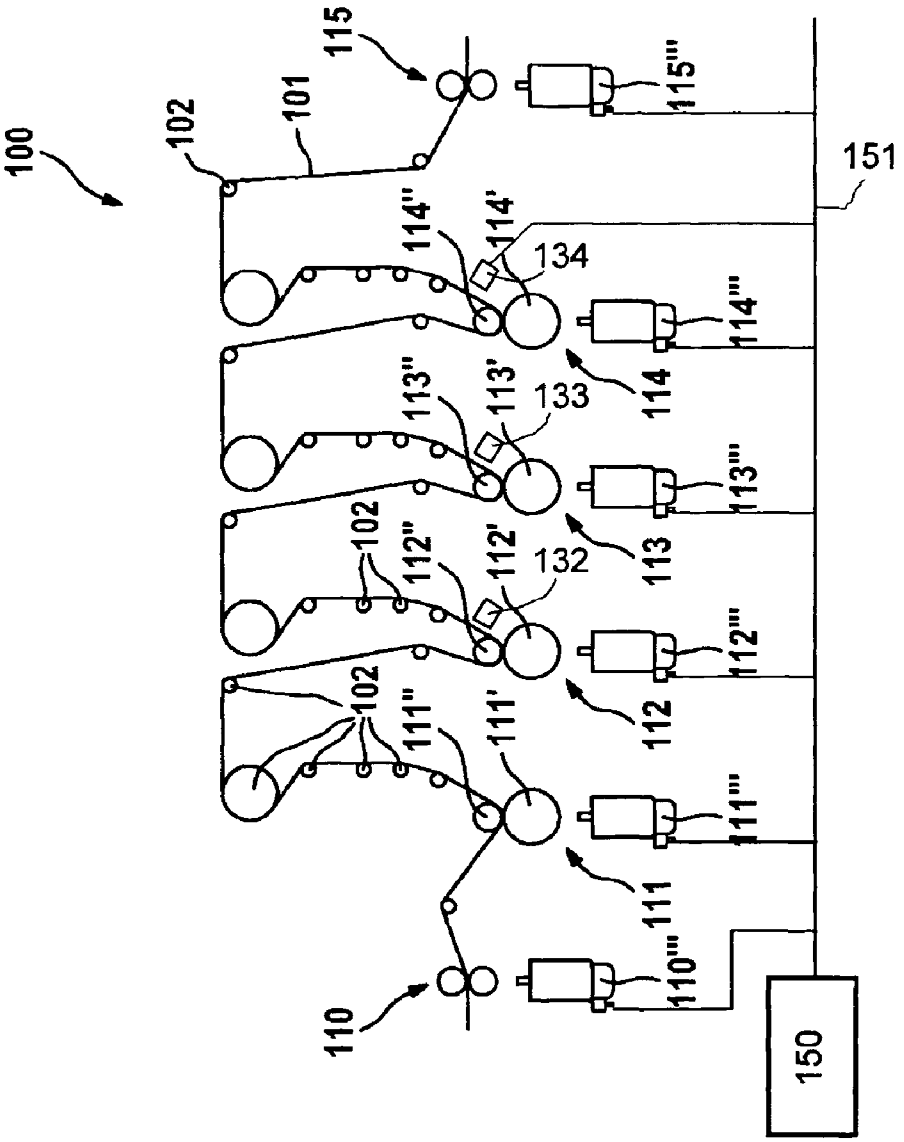
FIG. 1 shows a schematic illustration of a preferred embodiment of a processing machine according to the disclosure in the form of a printing machine.

In FIG. 1, a processing machine in the form of a printing machine is denoted overall by 100. A printing material, for example paper 101, is supplied to the machine via an infeed 110. The paper 101 is passed through processing devices in the form of printing mechanisms 111, 112, 113, 114 and printed and output again through an outfeed 115. The infeed, outfeed and printing mechanism are arranged such that they can be positioned, in particular in cylinder- or angle-correctable fashion. The printing mechanisms 111 to 114 are positioned in a web tension-controlled region between the infeed 110 and the outfeed 115.

The printing mechanisms 111 to 114 each have a printing cylinder 111' to 114', against which in each case one impression roller 111" to 114" is set with considerable pressure. The printing cylinders can be driven individually and independently. The associated drives 111'" to 114'" are illustrated schematically. The impression rollers are freely rotatable. The printing mechanisms 111 to 114 each form, together with the paper 101 passing through, a frictionally engaged unit (clamping point). The drives of the individual mechanisms are connected to a controller 150 via a data link 151. Furthermore, there is a plurality of sensors 132, 133, 134 for detecting register marks, which are likewise connected to the controller 150, between the printing mechanisms. Only one sensor 134 is illustrated as being connected to the controller for reasons of clarity. The controller 150 is designed for implementing the method according to the disclosure.

The paper 101 is guided over rollers (not illustrated in any more detail), which are denoted by 102, in the web sections between the individual printing mechanisms 111 to 114. For reasons of clarity, not all of the rollers have been provided with the reference symbol 102. The rollers may be in particular deflecting rollers, drying devices, cooling devices or cutting devices etc.

The text which follows describes how register and/or web tension control is implemented with the printing machine illustrated. The sensors 132, 133, 134, which determine the register position of the continuous web 101 and in addition are in the form of mark readers, for example, are arranged in the individual web sections between the printing mechanisms 112 to 114. As the continuous web 101, for example paper, passes through, in each case one mark reader is used to detect when a printing mark (not shown) which is preferably applied by the first printing mechanism 111 reaches the mark reader. The measurement value is supplied to a device for register control (register controller). Then, the position of the corresponding printing cylinder 112' to 114' is established and this measurement value is likewise supplied to the register controller. A respective register deviation can be calculated from this (web/cylinder correction). The established register deviations are used for positioning the printing mechanisms 112 to 114 and preferably also for positioning the infeed 110 and the outfeed 115.

Alternatively, the mark reader can measure positions or mark intervals of all previously applied register marks and supply them to the device for register control. A respective register deviation between applied register marks can be calculated from this (web/web correction) and can be used for positioning the printing mechanism 111 to 114 and preferably also for positioning the infeed 110 and the outfeed 115.

As an alternative or in addition, the web is preferably provided with a first sensor between the infeed 110 and the first printing mechanism 111 and with a second sensor between the last printing mechanism 114 and the outfeed 115, said sensors being in the form of web tension sensors. Web tension values detected by the sensors (not shown) are supplied to a device for web transport control (tension controller). The tension controller controls, depending on the web tension values, the drives 110''' and 115''' of the infeed 110 and the outfeed 115 and advantageously the drives 111''' to 114''' of the printing mechanisms 111 to 114. It goes without saying that the previously mentioned tension controllers and register controllers can be embodied in a common arithmetic logic unit 150, for example a computer.

Figure 2:
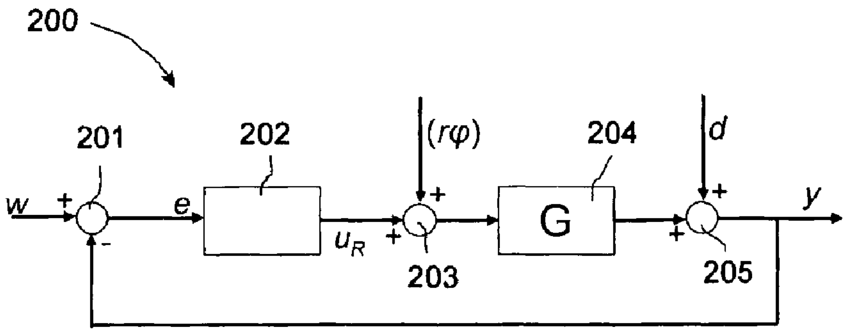
FIG. 2 shows a schematic illustration of a control loop of a processing machine comprising feedforward control.

FIG. 2 illustrates a control loop 200, which describes the main features of the control according to the disclosure. For example, a printing machine as shown in FIG. 1 can form the basis of the control loop. The control loop 200 comprises a comparison element 201, to which the reference variable w and the controlled variable y are supplied. The reference variable w describes, in the case of a printing machine, depending on the selected control strategy, a register deviation, for example, and in this case is generally predetermined as “0”. The controlled variable y in this case provides the determined register error. The comparison element 201 calculates from this the control difference e, which is supplied to the actual control element 202.

Depending on its configuration, for example in the form of a PI element, a PT1 element etc., the control element 202 calculates a controller output variable $u_R$, to which a feedforward control output variable rf is applied (additively in the example shown) and is finally supplied as manipulated variable to a controlled system G, which is denoted by 204. In a printing machine as shown in FIG. 1, the manipulated variable acts on a printing mechanism so as to correct the angular position thereof. It goes without saying that a multiplicative or differently configured feedforward control can likewise be used instead of the additive feedforward control 203 depicted.

Faults d which are generally intended to be compensated for during register control likewise enter additively via an adder 205 into the controlled variable y. The manipulated variable d brings about a change in the controlled variable which is undesirable and needs to be compensated for.

Figure 3:
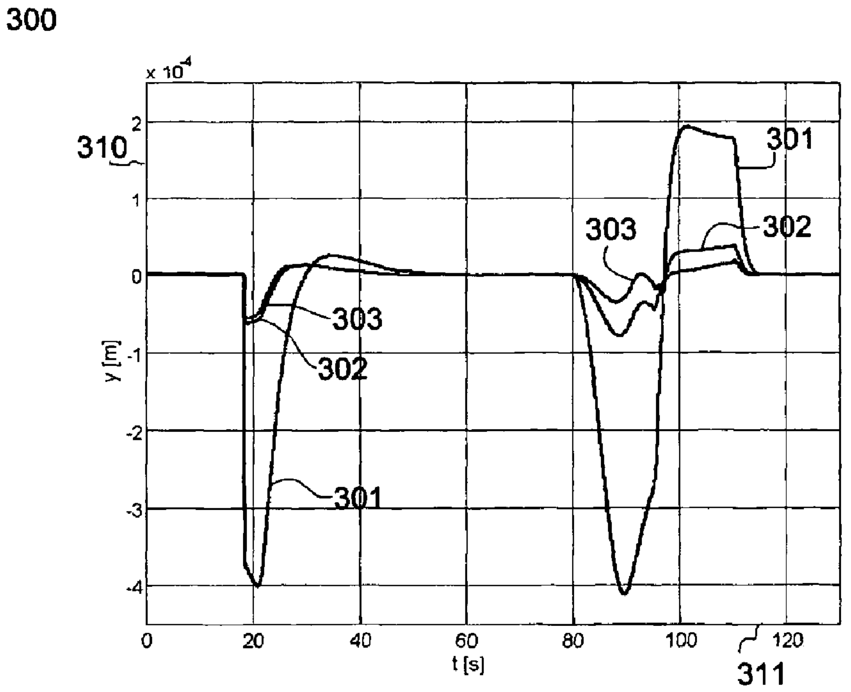
FIG. 3 shows, schematically, three profiles of register errors during successive acceleration phases of a printing machine.

The reduction in the longitudinal register error when implementing the method according to the disclosure in three successive machine runup phases will now be described with reference to FIG. 3. One graph 300 shows three register deviation or register error profiles 301, 302 and 303, which represent the register error or the controlled variable y at a selected printing mechanism, for example the printing mechanism 112 shown in FIG. 1, during three machine runup phases over time t. In the graph 300, the register error y is plotted on a y axis 310 over time t on an x axis 311. FIG. 3 shows the register error profiles in a dynamic case, wherein two accelerations of the printing mechanism involved take place per run.

The first acceleration starts beginning with the machine at a standstill approximately at t=18 s. In this case, the machine is accelerated uniformly to a first speed, in this case a web speed of 30 m/min, which is terminated at approximately t=30 s. It can be seen that the register error of the first run 301 caused by this acceleration reaches a maximum deviation of 0.4 mm at approximately t=20 s. Since a permissible deviation is generally in the region of 0.1 mm, waste material will already be produced at this point.

The machine has now reached a so-called setup speed, at which the individual printing mechanisms are generally set by the printer. The setup operation is terminated at approximately t=80 s, whereupon the machine is then accelerated to a second speed, in this case to a continuous web speed of 300 m/min, which is terminated at approximately t=110 s. It can again be seen that the register error 301 occurring during the first acceleration phase demonstrates large swings upwards and downwards, which go beyond the permissible limit of 0.1 mm. Printer’s waste is therefore also produced in this phase.

In accordance with a preferred configuration of the disclosure, the controller output variable is used in the acceleration range between t=80s and t=110s during the first run in order to determine correction values for correcting the speed-dependent and acceleration-dependent compensation values for this speed range of 30 to 300 m/min. In accordance with another configuration (not shown), the register error or the controlled variable y can also be used in the acceleration range in order to determine the correction values.

In order to determine the first correction value ΔCP for the first speed-dependent compensation value CP for the range of from $v_1$ to $v_2$ in accordance with an expedient configuration, the following holds true:

$$\Delta CP_n = u_R(v_2) - u_R(v_1)$$

where $\Delta CP_n$: first correction value which is determined from the n-th run;

$u_R(v_2)$: controller output variables at a second speed $v_2$;

$u_R(v_1)$: controller output variables at a first speed $v_1$.

In the example considered, the first correction value is expediently calculated as the difference in the controller output variable $u_R$ at the time at which the end speed is reached (300 m/min in the example) and the value of the controller output variable at the time at which the acceleration phase is begun (30 m/min in the example).

The correction value obtained in this way is added to the existing compensation value in order to give the compensation value for the subsequent run.

In general the following again holds true:

$$CP_{n+1}=CP_n+\Delta CP_n$$

where $CP_n$: first compensation value during the n-th change in rotation speed;

$\Delta CP_n$: first correction value which is determined on the basis of the observation of the controller output variable during the n-th change in rotation speed.

Feedforward control is performed during the second run 302 with the aid of this new compensation value $CP_2$. It can clearly be seen that the register error occurring is significantly reduced and is below the printer's waste limit of 0.1 mm throughout the acceleration range.

In a particular configuration, the correction value $\Delta CP$ of the compensation value CP can be provided with a weighting factor $\mu_n$ in order to be able to influence the changes in the compensation in the event of successive changes in rotation speed, i.e. $CP_{n+1}=CP_n+\mu_n\cdot\Delta CP_n$.

The feedforward control output variable rf itself is calculated for the speed range of $v_1$=30 m/min to $v_2$=300 m/min under consideration in a simple manner as:

$$(r\varphi)^{n+1} = CP_{n+1}\frac{v-v_1}{v_2-v_1}\forall\, v\epsilon[v_1, v_2]$$

where v: instantaneous speed.

In this case, a definition of the feedforward control output variable rf for an interval of the speed is specified. For other intervals, other relationships can be advantageous. For example, in the present case for adjoining ranges, constant feedforward control which continuously becomes proportional feedforward control would be expedient:

$$(r\varphi)^{n+1} = \begin{Bmatrix} 0 & \forall & v\epsilon[0, v_1] \\ CP_{n+1}\frac{v-v_1}{v_2-v_1} & \forall & v\epsilon[v_1, v_2] \\ CP_{n+1} & \forall & v > v_2 \end{Bmatrix}$$

Using the controller output variables $u_R$ obtained in the second run, it is possible in turn to determine a correction value $\Delta CP_2$ for correcting the compensation value $CP_2$, wherein the compensation value $CP_3$ obtained therefrom is used for the feedforward control for the third run. The associated register error profile is denoted by 303 and in turn has smaller values onto the profiles 301 and 302.

Preferably, acceleration-dependent feedforward control output variables rf are also determined simultaneously, and these variables are added to form the speed-dependent feedforward control output variables rf. In this case, the use of the following relationships has proven to be expedient:

$$\Delta CA_n = \mu_A\frac{u_R^* - u_R(v_3)}{a^*}$$

where $\Delta CA_n$: second correction value which is determined from the n-th run;

$\mu_A$: weighting factor between 0 and 1;

$u^*_R$: maximum controller output variable during the n-th change in rotation speed [between $v_3$ and the end of the acceleration or braking phase];

$u_R(v_3)$: controller output variables at a third speed $v_3$ (in this case 30 m/min);

a*: maximum acceleration during the n-th change in rotation speed [between $v_3$ and the end of the acceleration or braking phase].

The second compensation value is calculated as:

$$CA_{n+1}=CA_n+\Delta CA_n.$$

The second functional relationship is given as:

$$(rf)^{n+1}=a\cdot CA_{n+1}$$

where a: instantaneous acceleration.

The weighting factor $\mu_A$ can also be changed between acceleration phases in order to be able to influence the changes in the second compensation value in the event of successive changes in rotation speed.

With the solution according to the disclosure, it is therefore possible to iteratively reduce register errors and/or web tension deviations during an acceleration or braking phase of processing machines, with the result that, even after a few runs, the occurrence of printer's waste can be virtually avoided. Advantageously, no knowledge of any machine and/or material parameters is required for implementing the method.

It goes without saying that only a particularly preferred embodiment of the disclosure is illustrated in the figures shown. In addition to this, any other embodiment is conceivable without departing from the scope of this disclosure. In particular, only one embodiment of the method has been described in the figure, in which the controller output variable is observed. In addition to this, other embodiments are likewise preferred, in which the controlled variable, the control deviation and/or the processing parameter, for example a register or web tension deviation, are observed.

List of reference symbols

| | |
|---|---|
| 100 | Printing machine |
| 101 | Paper web |
| 110 | Infeed |
| 111-114 | Printing mechanism |
| 111'-114' | Printing cylinder |
| 111"-114" | Impression roll |
| 111'"-114'" | Drive |
| 115 | Outfeed |
| 132, 133, 134 | Register mark sensor |
| 150 | Controller |
| 151 | Data link |
| 200 | Control loop |
| 201 | Comparison element |
| 202 | Control element |
| 203, 205 | Adder |
| 204 | Controlled system |
| 300 | Graph |
| 301, 302, 303 | Register error profile |
| 310 | Y axis |
| 311 | X axis |

The invention claimed is:

1. A method for axis correction in a processing machine, which has at least one axis for processing a material, at least one detection device for detecting a processing parameter and at least one controller device for calculating a controller output variable for axis correction of the at least one axis using the detected processing parameter, wherein the method is implemented iteratively, such that feedforward control output values for the feedforward control of the axis correction are determined for an (n+1) th change in rotation speed of the at least one axis using observation of at least one of the controller output variable and/or the processing parameter during an nth change in rotation speed of the at least one axis, wherein the feedforward control output values are determined based on at least one of a speed and an acceleration, wherein a first functional relationship is defined between the feedforward output value and the speed, the first functional relationship including a first compensation value that is dependent upon the speed, wherein a second functional relationship is defined between the feedforward output value and the acceleration, the second functional relationship including a second compensation value that is dependent upon the acceleration, wherein the first and the second compensation values are each determined using the observation of the controller output variable or the processing parameter, wherein the first compensation values for the feedforward control of the axis correction during the (n+1)th change in rotation speed are determined from a first correction value and the first compensation value from the feedforward control of the axis correction during the nth change in rotation speed, wherein the second compensation values for the feedforward control of the axis correction during the (n+1)th change in rotation speed are determined from a second correction value and the second compensation value from the feedforward control of the axis correction during the nth change in rotation speed, and wherein the second correction value is determined with reference to the controller output variable or the processing parameter at a third speed during the nth change in rotation speed, an acceleration value during the nth change in rotation speed, and a differentiated controller output variable or a differentiated processing parameter, respectively, during the nth change in rotation speed.

2. The method as claimed in claim 1, wherein the feedforward control output values are determined depending on at least one of a speed and an acceleration using at least one of the observation of the controller output variable and the processing parameter, the speed comprising at least one of a rotation speed of the at least one axis and a machine speed.

3. The method as claimed in claim 1, wherein the first or the second functional relationship is divided into at least two dependency ranges.

4. The method as claimed in claim 1, wherein the first or the second compensation value is stored in a formula and when the method is implemented again, the stored compensation values are used for determining the feedforward control output values during the first change in rotation speed.

5. The method as claimed in claim 1, wherein the first or the second compensation value is determined for determining the feedforward control output values during the first change in rotation speed on the basis of a model using known machine or material parameters.

6. The method as claimed in claim 1, wherein second feedforward control output values are determined on the basis of a model using known machine or material parameters, which are used, in addition to the feedforward control output values, for the feedforward control of the axis correction.

7. The method as claimed in claim 1, wherein the axis correction is implemented for correcting a register.

8. The method according to claim 1, wherein the processing machine is a shaftless printing machine.

* * * * *

UNITED STATES PATENT AND TRADEMARK OFFICE

CERTIFICATE OF CORRECTION

PATENT NO. : 8,768,491 B2
APPLICATION NO. : 13/130504
DATED : July 1, 2014
INVENTOR(S) : Schultze et al.

It is certified that error appears in the above-identified patent and that said Letters Patent is hereby corrected as shown below:

In the Claims

Column 11, lines 12-14, of claim 1, should read:

observation of at least one of the controller output variable and the processing parameter during an nth change in rotation speed of the at least one axis, Signed and Sealed this
Ninth Day of December, 2014

Michelle K. Lee
*Deputy Director of the United States Patent and Trademark Office*